Patented Nov. 25, 1947

2,431,373

UNITED STATES PATENT OFFICE 2,431,373

COPOLYMERS OF DIVINYL BENZENE AND MONOHYDRIC ALCOHOL ESTERS OF ITACONIC ACID

Gaetano F. D'Alelio, Northampton, Mass., assignor to Pro-phy-lac-tic Brush Company, Northampton, Mass., a corporation of Delaware No Drawing. Application December 30, 1943, Serial No. 516,273

6 Claims. (Cl. 260—78.5)

This invention relates to the preparation of synthetic resin compositions and more particularly to the preparation of heat-convertible, soluble, fusible copolymers of divinyl benzene.

It is known that the polymerization of compounds possessing more than one terminal $CH_2=C<$ grouping, providing the system is not conjugated and under the normal conditions of polymerization, results in the formation of a cross-linked insoluble, infusible polymer. It is likewise known that organic compounds containing a plurality of $CH_2=C<$ groups, such as the dienes, and specifically the butadienes, will also act as cross-linking agents when the polymerization is uncontrolled. Examples of such compounds resulting in insoluble, infusible polymers are glycol dimethacrylate, divinyl ether, vinyl allyl ether, allyl acrylate, diallyl phthalate, diallyl ether, dimetallyl ether, etc. Divinyl benzene polymerises rapidly so that it is hard to control and produces an insoluble, very hard, infusible, nonworkable mass.

The present production of divinyl benzene monomer is carried out in such a manner that the resulting product is an inseparable mixture of about 15-30% in the diethyl benzene from which it was prepared. The present invention is of importance because it utilizes this inseparable mixture.

Extensive experiments carried out on the polymerization of divinyl benzene in the dialkyl benzene indicate that an insoluble resin is obtained as a gel when ordinary polymerization methods are employed. This gel formation takes place in a short time, e. g., 15-20 minutes. The extreme sensitivity of this reaction makes its use difficult in industrial applications.

I have now discovered that divinyl benzene in solution may be partially copolymerized with an itaconic acid ester of a monohydric alcohol to form a soluble, fusible, heat-convertible copolymer mass. Although the copolymeric products of this invention are fusible and soluble, they are still ethylenically unsaturated and still possess polymerizability and heat-convertibility, and may therefore be converted to an insoluble, infusible state. These soluble, fusible copolymers also possess the property that they themselves may be used as the cross-linking agents for other polymerizable monomers and polymers.

In my copending applications, Serial No. 516,-271 filed December 30, 1943, and Serial No. 516,-272, filed December 30, 1943, I described the use of maleic esters in the preparation of soluble, fusible, heat-convertible copolymers of divinyl benzene, and now I have also discovered that the itaconic esters behaved in a fashion similar to the maleic esters. This was unexpected since, even though the maleic, fumaric, and itaconic esters are derived form unsaturated dicarboxylic acid, the itaconic esters contain a terminal $CH_2=C<$ whereas the maleic and fumaric esters possess a $—CH=CH—$ linkage.

The process of this invention, whereby a soluble, fusible polymerizate of divinyl benzene may be isolated from a dialkyl benzene having at least two carbon atoms in each alkyl grouping comprises polymerizing the solution of divinyl benzene in a dialkyl benzene in the presence of at least one itaconic ester which not only acts as a moderator of the reaction but also as a copolymerizing monomer. The mixture of the divinyl benzene and the itaconic ester in the dialkyl benzene is copolymerized for a time less than that required to cause separation of the polymer. The dissolved partial copolymer is then precipitated by the addition of a non- or partial solvent or by the evaporation of the volatile constituents.

The sensitivity of divinyl benzene solutions to polymerizing conditions is reduced by the presence of an itaconic ester. Divinyl benzene solutions containing itaconic esters have increased gellation times depending on the conditions of polymerization. If the polymerization occurs too rapidly, an undesirable product is obtained because of a low yield of a non-soluble, non-fusible polymer retaining both unreacted monomers and low boiling hydrocarbon diluents, such as diethyl benzene. The diluents are removed with extreme difficulty, such as by extraction with methanol, and even if these diluents are removed, the residual polymer is of little or no value because it is non-soluble and non-fusible. By means of this invention I may cause the copolymers to form at a much slower rate, thus providing a means of permitting a greater permissible deviation from any calculated time required to give a maximum yield of soluble, fusible copolymer. The time required depends upon the type of the itaconic ester and the polymerization catalyst present in the solution. I have found that by varying the conditions, a soluble, fusible copolymer may be obtained in a wide limit of reaction times.

For polymerization catalysts in the preparation of the soluble, fusible copolymers of this invention, I may use the aliphatic acyl peroxides, e. g., acetyl peroxide, lauryl peroxide, stearyl peroxide, etc.; peroxides of the aromatic acid series, e. g., benzoyl peroxide, etc.; ketone peroxides, e. g., acetone peroxide, etc., ozone, ozonides; inorganic superoxides such as barium peroxide, sodium peroxide, etc.; the persulfates; the perborates; the alkyl derivatives of hydrogen peroxide, e. g., ethyl hydrogen peroxide, diethyl peroxide, etc.; mixed organic peroxides, e. g., acetyl benzoyl peroxides; organic and inorganic acids such as methyacrylic acid, hydrofluoric acid and their derivatives such as boron trifluoride, etc.; hydrogen peroxide, etc. However, benzoyl peroxide is the preferred catalyst. Any suitable amount of catalyst may be used, but in general will be within the range of 0.1-2.0% by the weight of the polymerizable components of the reaction mass.

The actual copolymerization of the divinyl benzene and the itaconic ester in the dialkyl solution may be accomplished by any suitable means. However, I prefer to cause the copolymerization under the influence of external heat in the presence of a catalyst for a period substantially less than required to cause gellation of the solution mixture. For purposes of economy and convenience, I prefer to use reflux temperatures and atmospheric conditions although reduced or elevated temperatures and pressures ranging from subatmospheric to superatmospheric may be used. The partial copolymers of divinyl benzene and the esters of this invention may be precipitated from the dialkyl benzene by the addition of a non-solvent, e. g., methyl alcohol, ethyl alcohol, ethylene glycol, etc.

As the copolymerizing ingredient which likewise acts as a moderator and controlling ingredient of the reaction I may use at least one itaconic diester of a monohydric alcohol of the type having the formula $$CH_2=C-COOR \atop | \atop CH_2COOR$$

wherein R represents the residue of monohydroxy alcohol. The only requirement of the alcohol is that it possess one esterifiable hydroxyl group. As alcohols which may be used in esterifying itaconic acid and its esterifiable derivatives, I may use methyl, ethyl propyl, isopropyl, butyl, isobutyl, amyl, secondary amyl, isoamyl, mixed amyl, hexyl, cyclopentyl, cyclohexyl, methyl cyclopentyl, methylcyclohexyl, benzyl, phenethyl, chloroethyl, acetoxyethyl, methoxyethyl, ethoxyethyl, butoxyethyl, phenoxyethyl, chlorphenoxyethyl, acetoxypropyl, methoxypropyl, ethoxypropyl, phenoxypropyl, carbalkoxyethyl, allyl, methallyl, crotyl, cinnamyl, etc., alcohols.

The ester groups in the itaconic ester may be the same or different. Thus, the ester may be a methyl ethyl, a dimethyl, a diethyl, a methyl propyl, a dipropyl, a methyl allyl, etc., ester of itaconic acid. When an unsaturated alcohol ester of itaconic acid is used in the practice of this invention, the unsaturated diester, as for example, diallyl, dimethallyl, etc., itaconate may be used. However, for economic reasons and for purposes of better and more accurate control, I may use an itaconic ester containing only one unsaturated alcohol ester radical such as allyl ethyl itaconate, allyl propyl itaconate, allyl butyl itaconate, etc. Numerous other examples of itaconic esters suitable for the purposes of this invention are given in my issued U. S. Patents, Nos. 2,279,881; 2,279,882; 2,310,731; 2,279,883; 2,279,884; 2,279,885.

In my copending application, Serial No. 448,156, filed June 23, 1942, I have described the process which comprises polymerizing divinyl benzene in solution in a dialkyl benzene having at least two carbon atoms in each alkyl grouping, in the presence of both an inhibitor of and a catalyst for polymerization, for a period less than required to cause gellation of the solution, and isolating the partially polymerized product, the inhibitor of polymerization being a compound of the formula

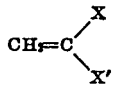

wherein X is a member of the class consisting of hydrogen and halogen and alkyl aryl, carboalkoxy, and carbaroxy radicals; and X' is a member of the class consisting of halogen and aryl, carbalkoxy, carbaroxy, nitrile, and acyloxy radicals.

In my copending application, Serial No. 448,155, filed June 23, 1942, I have claimed the process which comprises polymerizing divinyl benzene in solution in a dialkyl benzene having at least two carbon atoms in each alkyl grouping, in the presence of both an inhibitor of and a catalyst for polymerization, for a period substantially less than required to cause gellation of the solution, and isolating the partially polymerized product, the inhibitor of polymerization being a compound of the formula $$CH_2=\overset{R}{\underset{|}{C}}-Y$$

wherein R is a member of the class consisting of hydrogen and methyl and Y is a member of the class consisting of —CR'$_2$OR', —CR'$_2$X, —CR'$_2$OCOR', and —CR'O radicals wherein R' is a member of the class consisting of hydrogen and alkyl and aryl radicals and X is a halogen.

The products and processes of this invention differ from the products and processes mentioned above in that the co-reactivity of the itaconic esters depends on a terminal

grouping attached to two carboxyl groups. One of these carboxyls is attached directly to the ethylenic linkage and the other is attached through a methylene (—CH$_2$—) group, thus

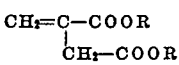

and that the most probable structure of the reaction product of a divinyl benzene and an itaconic ester has the general structure

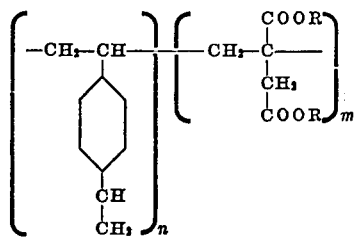

wherein the numerical values of n and m are dependent on the mol ratio of the divinyl benzene and the ester used, and the unreacted vinyl group contributes heat convertibility to the soluble, fusible copolymer. Another advantage accrues from the use of the itaconic esters in that by copolymerization they can act as internal plasticizers for the divinyl benzene polymerizate and that the degree and type of internal plasticizing effect can be varied over a wide range depending on the nature of the ester group, that is, whether the ester groups are short or long, whether they are similar or identical or whether the hydrocarbon group of the ester radical is substituted by a halogen or by an alkoxy group.

An even greater advantage results from the use of the itaconic esters in the practice of this invention, if the ester radical is unsaturated and polymerizable, such as, for example, in the use of a mono allyl alkyl itaconate. In this particular case, the

radical of the itaconic acid polymerizes at a more rapid rate than the allyl ester radical resulting in a copolymer with divinyl benzene whose probable structure is.

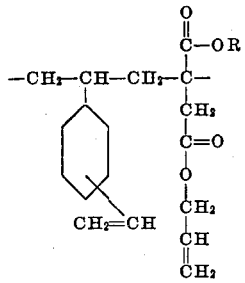

wherein R may or may not possess ethylenic unsaturation. This is indicated by the fact that itaconic esters polymerize readily with styrene whereas the copolymer of styrene and an allyl monoester, e. g., allyl acetate, is extremely difficult to prepare. The use of unsaturated alcohol esters of itaconic acid as a copolymerizing monomer for divinyl benzene is not to be confused with the invention claimed in my copending application, Serial No. 448,159, filed June 23, 1942, wherein is claimed a heat-convertible, soluble, fusible partial copolymer of divinyl benzene and at least one other compound containing a plurality of non-conjugated

groupings, since the copolymerizability of the class of compounds of the allyl esters of polybasic acids disclosed in that invention depends strictly on a terminal

grouping of the allyl ester radical, whereas the capability of the esters in this invention to polymerize with divinyl benzene depends strictly on the ethylenic double bond of the itaconic esters. More specifically the copolymerizability of the unsaturated alcohol polyesters of the saturated aliphatic and aromatic polycarboxylic acids, diallyl phthalate, diallyl oxalate, etc., depend on the allyl, $CH_2=CH-CH_2-$, group and that if the dimethyl ester of phthalic or oxalic acid is used, no copolymer is formed. On the other hand, the saturated alcohol esters of itaconic acid, devoid of allyl groups, still form copolymers with divinyl benzene.

A wide range of concentrations of divinyl benzene and itaconic ester may be used in carrying out the practice of my invention depending on the nature of the products desired. Thus, I may use ten mols of divinyl benzene to one mol of itaconic ester, for example, dimethyl itaconate, diethyl itaconate, propyl allyl itaconate, etc. In other cases, as for example, with ethyl hexyl or decyl itaconate, the mol ratio of the divinyl benzene to the itaconate may be as high as twenty or thirty of the former to one mol of the latter.

The copolymers of this invention may be modified to a considerable extent by the presence of other unsaturated and polymerizable materials admixed with the solution at the initiation of polymerization of the divinyl benzene in the dialkyl benzene and itaconic ester. As prepared, the divinyl benzene solution may contain varying quantities of the isomeric ethyl styrenes. These bodies comprise some of the components of the inseparable mixture. The divinyl benzene solution probably contains three isomers of divinyl benzene. Other monomers may be added to vary the nature of the resulting copolymer. Illustrative examples of such compounds are the vinyl halides, e. g., vinyl chloride; the vinylidene halides, e. g., vinylidene chloride, vinylidene fluorchloride, etc.; the acrylic acids, e. g., acrylic acid, methacrylic acid, chloroacrylic acid; the esters of acrylic acid, e. g., methyl acrylate, ethyl acrylate, ethyl methacrylate, methyl methacrylate, methyl chloracrylate, fluorophenyl acrylate, etc.; the aryl ethylenes, e. g., styrene, methyl styrene, isopropenyl toluene, toluyl ethylene, bromotoluyl ethylene, etc.; the vinyl esters, e. g., vinyl acetate, vinyl propionate, vinyl butyrate, vinyl benzoate; the nitrile derivatives of acrylic and methacrylic acid, e. g., acrylonitrile, methacrylonitrile, etc.; methylene malonic esters; the mono alkyl esters, e. g., the methyl ester; the diesters, e. g., the dimethyl ester, the dipropyl ester, etc.; the allyl derivatives, e. g., acrolein, methacrolein, allyl methyl ketone, allyl ethyl ketone, allyl chloride, allyl methyl ether, allyl ethyl ether, allyl propyl ether, allyl phenyl ether, allyl acetate, allyl propionate, allyl benzoate, vinyl ethyl ketone, allyl acrylate, methallyl acrylate, diallyl phthalate, diallyl oxalate, diallyl succinate, divinyl ether, diallyl ether, divinyl ketone, diallyl ketone, dimethallyl ketone, etc. As copolymerizing modifiers I may also use the maleic esters disclosed in my copending applications, Serial Nos. 516,271 and 516,272, both filed December 30, 1943.

The course of the polymerization likewise may be modified by the presence of inhibitors such as copper, sulfur, naphthyl amine, carbon tetrachloride, etc.

In order that those skilled in the art may better understand the teachings of my invention, the following examples are given:

*Example 1*

| Parts of 23% Sol'n of divinyl benzene in diethyl benzene | Divinyl Benzene | Diethyl Itaconate | Benzoyl Peroxide |
| --- | --- | --- | --- |
|  | Parts | Parts | Parts |
| 113.5 equals | 26.1 | 25 | 0.25 |
| 113.5 equals | 26.1 | 75 | 0.25 |

In the last mixture in the table, the molar ratio of divinyl benzene to the ester is about 1 to 2. In order to isolate the soluble, fusible partial copolymer from any of the above compositions, the refluxing in each case is carried to a point short of gellation. The presence of the itaconate ester retards the gellation reaction. The viscous solution of the partial copolymer is poured into methanol or ethanol and the precipitate removed, dried, and ground. If not carried too far, the product will be soluble in the usual hydrocarbon solvents and completely fusible. Those copolymers prepared from high concentrations of itaconic esters will likewise be soluble in acetone. These copolymers contain the itaconic ester interpolymerized with the divinyl benzene as is evident from the fact that drastic hydrolysis results in the alcohol of the itaconic ester and that the polymeric residue possesses an acid number. In the industrial preparation of such resins the previous history and the nature of the divinyl benzene solution must be taken into account and a controlled run which has been brought to the gellation point is used as a standard for future polymerizations of the particular materials employed.

*Example 2*

I may also control the rate of the copolymerization of the divinyl benzene and the itaconic ester by the addition of an inert non-reactive hydrocarbon.

| | Parts by weight |
|---|---|
| Divinyl benzene (100 parts 25% sol. in diethyl benzene) | 25.0 |
| Diethyl itaconate | 28.7 |
| Benzoyl peroxide | 0.22 |
| Benzene | 100.0 |

This mixture is refluxed in an excess of a corresponding mixture without benzene. The copolymer may be isolated by precipitation with non-solvents.

*Example 3*

The soluble, fusible copolymers of Examples 1 and 2 may be modified by copolymerizing the divinyl benzene and an ester of itaconic acid in the presence of other monomers, for example, from 5 to 75–100 parts of the following; ethyl methacrylate, styrene, vinyl acetate, ethyl acrylate, isopropenyl toluene, diallyl phthalate, diallyl maleate, diethyl maleate, allyl ethyl maleate, etc.

The isolated, soluble, fusible copolymers of divinyl benzene and an itaconic ester may be stored for long periods of time without fear of advancing to a more highly polymerized state. These copolymers will be found to be extremely soluble in other unsaturated monomers, and, in fact, generally more soluble in these monomers than a normal polymer of divinyl benzene. They will be found to be soluble in such monomers as styrene, ethyl acrylate, ethyl methacrylate, vinyl acetate, etc., as well as in certain ketones, aromatic solvents such as benzene, toluene, diethyl benzene, aromatic hydrocarbon oil fractions as well as their chlorinated products. These copolymers will copolymerize with a variety of unsaturates containing a $CH_2=C<$ group, e. g., styrene, methyl or ethyl methacrylate, vinyl acetate, diallyl phthalate and diallyl maleate. Thus, one or more compounds containing a $CH_2=C<$ group may be added to the divinyl benzene solution containing the monohydric alcohol ester of itaconic acid and copolymerized, or the isolated copolymer of divinyl benzene and the ester may be copolymerized with a compound containing a $CH_2=C<$ group.

The soluble, fusible copolymers of this invention yield when completely cured a hard abrasive mass dependent on their compositions. Under the influence of heat, they can be caused to form an infusible, abrasive-resistant and solvent resistant state. By virtue of these extraordinary properties possessed by the isolated, soluble, fusible copolymers and the resulting insoluble, infusible copolymers, a wide field of industrial applications is opened. For example, I may use the soluble, fusible polymers in coating compositions alone or modified with other resins such as polystyrene or an unsaturated alkyd resin. I may prepare castings from these copolymers by, for example, dissolving the resin in some unsaturated monomer having at least one $CH_2=C<$ grouping and copolymerizing the solution under the influence of external heat and a polymerization catalyst.

Where so desired, the soluble, fusible copolymers of this invention may be used as molding compositions since they are heat convertible. These compositions may be modified further by including fillers, opacifiers, pigments, lubricants, etc. I may also use the copolymers of this invention as the cohesive ingredients in laminates.

When these copolymers are dissolved in hydrocarbons and chlorinated hydrocarbon oils in the presence of another monomer, a gel is formed which may be used for several commercial applications, as, for example, a dielectric gel in capacitors and bushings.

I claim:

1. The process which comprises heating a 15 to 30 per cent solution of divinyl benzene in a diethyl benzene in the presence of a polymerization catalyst and a monohydric alcohol diester of itaconic acid for a period less than required to cause gelation, thereby producing a soluble, fusible copolymer, and isolating the copolymer so produced, the molar ratio of divinyl benzene to said ester being not greater than 30 to 1.

2. The process which comprises heating a 15 to 30 per cent solution of divinyl benzene in diethyl benzene in the presence of a polymerization catalyst and diallyl itaconate for a period less than required to cause gelation, thereby producing a soluble, fusible copolymer, and isolating the copolymer so produced, the molar ratio of divinyl benzene to said ester being not greater than 30 to 1.

3. The solid, heat convertible, fusible polymerization product of a mixture comprising divinyl benzene and a monohydric alcohol diester of itaconic acid, the molar ratio of divinyl benzene to the ester being between 30 to 1 and 1 to 2.

4. The solid, heat convertible, fusible polymerization product of a mixture comprising divinyl benzene and diethyl itaconate, the molar ratio of divinyl benzene to the ester being between 10 to 1 and 1 to 2.

5. The solid, heat convertible, fusible polymerization product of a mixture comprising divinyl benzene and diallyl itaconate, the molar ratio of divinyl benzene to the ester being between 10 to 1 and 1 to 2.

6. The solid, heat convertible, fusible polymerization product of a mixture comprising divinyl benzene and allyl propyl itaconate, the molar ratio of divinyl benzene to the ester being between 10 to 1 and 1 to 2.

GAETANO F. D'ALELIO.

REFERENCES CITED

The following references are of record in the file of this patent:

UNITED STATES PATENTS

| Number | Name | Date |
|---|---|---|
| 2,256,160 | Britton et al. | Sept. 16, 1941 |
| 2,047,398 | Voss et al. | July 14, 1936 |
| 1,811,078 | Dykstra | June 23, 1931 |
| 2,273,891 | Pollack, et al. | Feb. 24, 1942 |